June 1, 1948. W. A. TOLSON ET AL 2,442,626
SYNCHRONOUS INDUCTION MOTOR
Filed June 12, 1946
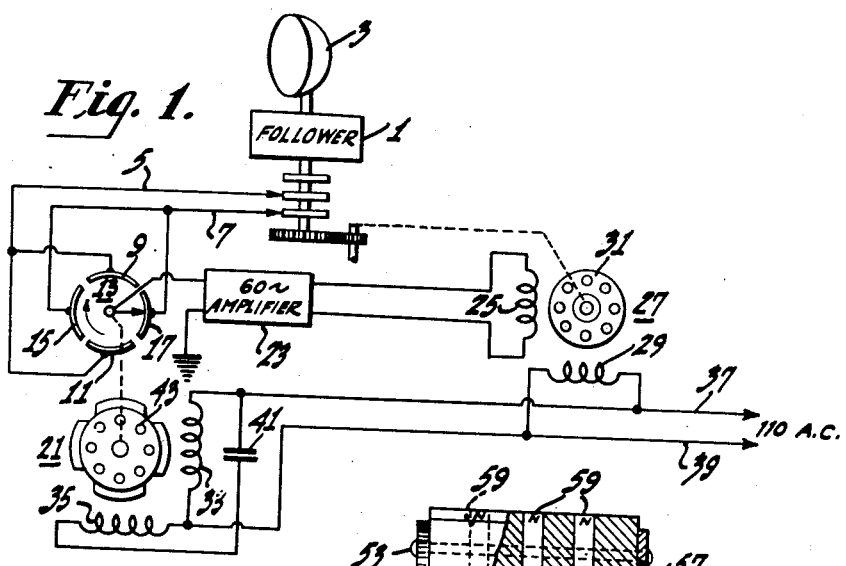
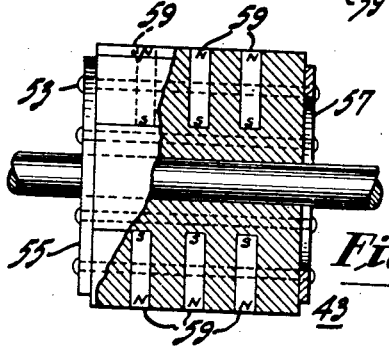
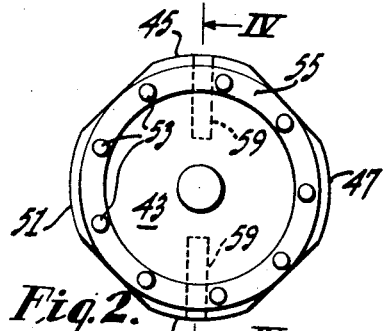
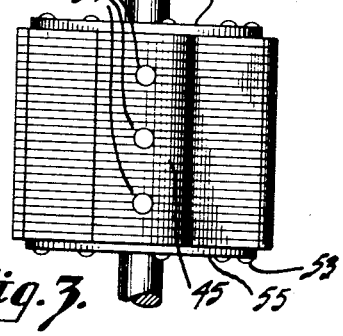
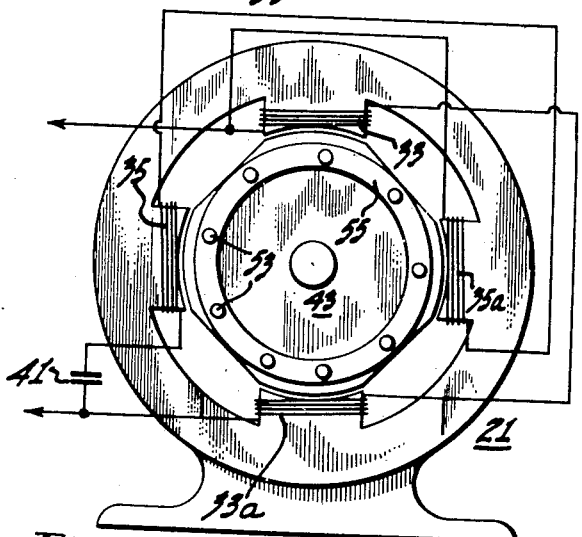
INVENTORS
William A. Tolson
& Carl A. Meneley
ATTORNEY Patented June 1, 1948

2,442,626

UNITED STATES PATENT OFFICE 2,442,626

SYNCHRONOUS INDUCTION MOTOR

William A. Tolson and Carl A. Meneley, Princeton, N. J., assignors to Radio Corporation of America, a corporation of Delaware Application June 12, 1946, Serial No. 676,161

6 Claims. (Cl. 318—166)

This invention relates to synchronous induction motors, and particularly to means for insuring that the rotor of such a motor will always fall into step in the same relative position, or a position 180° displaced therefrom, but will not fall into step with the rotor displaced 90° or 270° from a given orientation.

It is well known that when the secondary iron of a synchronous induction motor is shaped so as to form salient poles of the same number as that of the primary winding the motor will pull into synchronism and operate at a true synchronous speed, provided the load is not too high. In motors of this type there are relatively movable primary and secondary windings. A rotating magnetic field is produced by applying phased currents to the primary. The secondary is usually, although not always, the rotor. When the rotor is not up to speed, the rotating field induces currents in the short-circuited conductors of the rotor which create secondary fields which, in any given pole, alternate from north to south polarization at a rate depending on the slip. At synchronous speed the slip is zero and the induced current is very low. Any given pole may then be considered as being either a north or a south pole, and does not change.

For ordinary purposes it does not matter whether a given rotor pole becomes north or south when synchronism is reached. In certain cases, however, it is highly important to insure a specific predetermined polarity, and it is the purpose of this invention to insure this. Briefly, the invention consists in mounting in at least one of the rotor poles a permanent magnet which causes that particular pole to orient the rotor so that the induced currents will polarize that pole with the polarity of the magnet. Preferably magnets are mounted in diametrically opposed poles to insure mechanical balance.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which Figure 1 is a simplified diagram of a direction finder illustrating the need for a synchronous motor embodying this invention;

Figures 2, 3 and 4 are end, top and cross section views, respectively, of a rotor embodying this invention; and Figure 5 illustrates a synchronous motor made in accordance with this invention.

Referring to Fig. 1, there is illustrated diagrammatically a conventional automatic follower type direction finder. The follower mechanism, 1, is for example, a device of the type described and claimed in a copending application of Meneley, Serial No. 634,365, filed December 11, 1945. This device is sensitive to heat waves radiated by an object such as a ship, or the like, and includes a directional pickup reflector 3. When the directional axis of the reflector lies to the right of the ship a direct current output voltage is produced between ground and the output leads 5, 7, of a polarity, for example, such that lead 5 is positive with respect to ground and lead 7 is negative with respect to ground. When the axis of the reflector is to the left of the airplane the polarity reverses, and lead 7 is then positive and lead 5 negative with respect to ground. Lead 5 is connected to the opposite segments 9, 11 of a commutator 13, while lead 7 is connected to the alternate segments 15 and 17. A contact arm 19, driven at a speed of 30 R. P. S. by a synchronous induction motor 21, is connected to the input of a 60 cycle amplifier 23 which converts the square wave voltage from the commutator to an essentially sine wave 60 cycle current. The amplifier output is applied to one winding 25 of a reversible alternating current motor 27. This motor is of the type having two stator windings, the second one 29, being energized by the commercial power lines 37, 39. The rotor 31 drives the follower 1. Reversing the phase of the current applied to winding 25 by 180° reverses the direction of rotation of the motor. The polarity is made such that the direction of rotation always turns the follower towards the object being followed.

Synchronous motor 21 also has physically displaced stator windings 33 and 35, one of which is connected across the 60 cycle lines 37, 39, the other being connected across the lines through a phasing capacitor 41 which produces a rotating field in motor 21, as is well known.

Referring now to Figures 2 to 5, in which corresponding elements have the same reference numerals, a synchronous induction motor rotor is illustrated which has four salient poles 45, 47, 49 and 51, formed in any convenient manner by shaping the laminated iron stack of the rotor so as to concentrate the flux into four paths displaced about the rotor circumference at 90° intervals. When starting, there is a large amount of slip since the rotor is not rotating as fast as the stator field. Consequently large magnetizing currents are induced in the copper conductors 53, which are short circuited at both ends of the rotor by shorting rings 55 and 57. As a result, the poles are magnetized alternately as north and then south poles. When poles 45 and 49 are north, for example, poles 47 and 51 are south, and vice versa. When synchronous speed is reached, however, the four poles assume and maintain a fixed polarity. However, there is ordinarily no way of controlling the polarity of a given pole. If poles 45 and 49 are north, for example, the rotor will assume a certain orientation with respect to the stator field, since the north rotor field will always seek a south stator field. If poles 45 and 49 were south poles, however, the position of the rotor would have to be advanced or retarded 90° to retain the proper orientation with respect to the stator field. The stator field is, of course, determined by the line current, which is herein considered as a point of reference.

There are, therefore, four positions which the rotor may assume when synchronism is reached. At the instant $T_0$ that the line current is a maximum in what may be termed the positive direction, the pole 45 may be in any one of four positions. The rotating contact arm of commutator 13 would also be on any one of the four commutator segments at that instant. If it is on segment 17 which is then negative, the output of amplifier 23 will have a certain phase with respect to the line current, and the motor 27 will rotate the follower 1 in the proper direction. If, however, pole 45 had assumed a south polarity at that instant $T_0$, the resultant 90° rotor displacement would cause the commutator arm to contact segment 9 or 11 instead. This would reverse the phase of the output current of amplifier 23 and reverse the direction of motor 27. Instead of turning toward the object, the follower would then turn away from it.

It will be apparent, therefore, that it is necessary to predetermine the polarity which will be assumed by any given rotor pole when the rotor reaches synchronism. In accordance with this invention, this is accomplished by embedding in the rotor iron at the center of oppositely disposed poles, one or more permanent magnets 59. The magnets are preferably Alnico, and may be cylindrical plugs, forced into appropriate holes drilled in the rotor iron. The ends of the magnets in any pole will have the same polarity, the case in which all north poles are exposed being illustrated. If desired, such magnets may be used in all the poles, in which case alternate north and south polarities would be exposed. The magnets must, of course, be evenly balanced for weight and position so as not to upset the balance of the rotor.

The permanent magnetic field produced by the magnets 59 cause the rotor to so orient itself at the synchronous speed that a given pole will always assume the same relative position and polarity with respect to the rotating magnetic field, thus insuring correct operation of the follower every time the equipment is started. This obviates the necessity of stopping and starting the motor until the rotor, by chance, falls in properly, a procedure which previously has been required.

The permanent magnets may be large enough to provide the necessary control when only one is used in each of two poles. However, in order to avoid contact with the conductors 53 it may be necessary to limit their diameter and employ several, axially displaced along the rotor. Three have been illustrated.

The invention has thus been shown to comprise a means for establishing a predetermined polarity in the rotor poles of a synchronous induction motor, so that the rotor will always assume a predetermined position with respect to the rotating field produced by the stator.

What we claim is:

1. In a synchronous induction motor, a rotor having an axis of rotation comprising a plurality of short circuited conductors mounted in a form of magnetically permeable material, said permeable material forming at least four salient poles for concentrating the magnetic flux produced by currents induced in said conductors, and permanent magnets having magnetic axes mounted in at least two oppositely disposed poles with said magnetic axes extending radially from said axis of rotation, said magnets presenting magnetic fields of the same polarity to the surface of said salient poles.

2. A synchronous induction motor comprising relatively rotatable primary and secondary members, said secondary member obtaining its excitation from said primary member and having a core of highly permeable magnetic material forming at least four salient poles, and permanent magnets within said salient poles for establishing a predetermined polarity in each of said poles, each of said magnets having a magnetic axis, said magnets disposed within said salient poles with said magnetic axis perpendicular to the face of said pole.

3. In a synchronous induction motor, a rotor having an axis of rotation and comprising a plurality of short circuited conductors mounted in a highly permeable magnetic material, said permeable material forming a plurality of salient poles for concentrating the magnetic flux produced by currents induced in said conductors, and permanent magnets disposed within said salient poles for establishing a predetermined polarity in said salient poles, the said magnets having magnetic axes extending radially from said axis of rotation.

4. In a synchronous induction motor, a rotor having an axis of rotation and comprising a plurality of short circuited conductors mounted in highly permeable magnetic material forming at least four salient poles for concentrating the magnetic flux produced by currents induced in said conductors, and permanent magnets disposed within said salient poles for establishing a predetermined polarity in said salient poles, the said magnets having magnetic axes extending radially from said axis of rotation.

5. In a synchronous induction motor, a rotor having an axis of rotation and comprising a plurality of short circuited conductors mounted in a highly permeable magnetic material, said permeable material forming at least four salient poles for concentrating the magnetic flux produced by currents induced in said conductors, and permanent magnets disposed within at least two diametrically opposite salient poles for establishing a predetermined polarity in said salient poles, the said magnets having magnetic axes extending radially from said axis of rotation, said magnets presenting magnetic fields of the same polarity to the surface of said salient poles.

6. In a synchronous induction motor, a rotor having an axis of rotation and comprising a plurality of short circuited conductors mounted in a highly permeable magnetic material, said permeable material forming at least four salient poles for concentrating the magnetic flux produced by currents induced in said conductors, and permanent magnets disposed within said salient poles for establishing a predetermined polarity in said salient poles, the said magnets having magnetic axes extending radially from said axis of rotation, said magnets presenting magnetic fields of the same polarity to the surface of said salient poles.

WILLIAM A. TOLSON.
CARL A. MENELEY.

REFERENCES CITED

The following references are of record in the file of this patent:

UNITED STATES PATENTS

| Number | Name | Date |
|---|---|---|
| 2,418,980 | Morrill | Apr. 15, 1947 |

Certificate of Correction

Patent No. 2,442,626.

June 1, 1948.

WILLIAM A. TOLSON ET AL.

It is hereby certified that error appears in the printed specification of the above numbered patent requiring correction as follows: Column 2, line 8, for the filing date "December 11, 1948" read *December 11, 1945*; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.*